Figure 3:
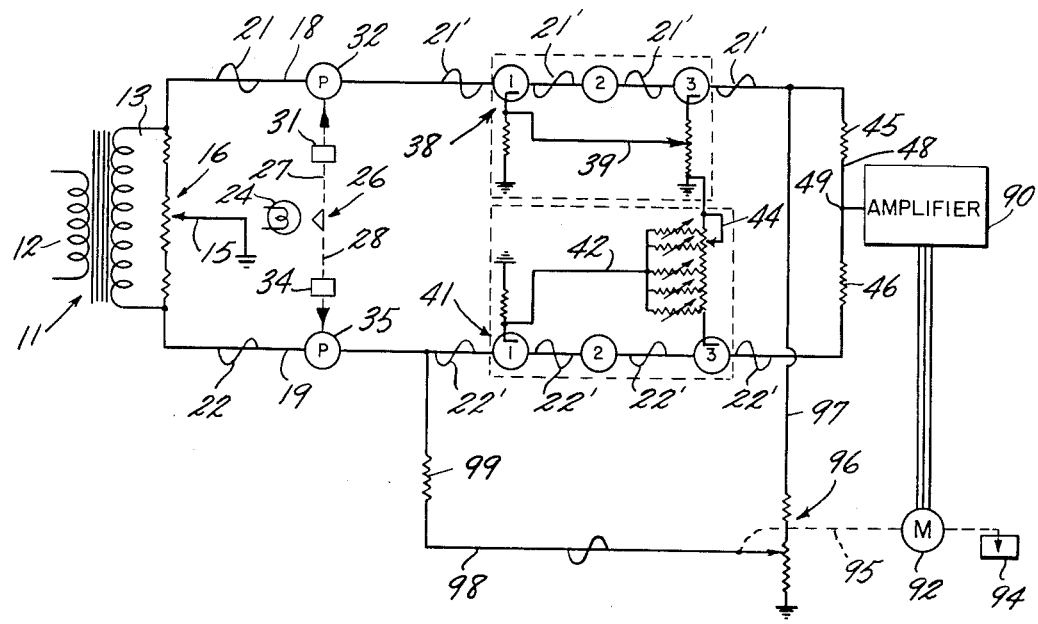

Nov. 1, 1955 C. W. WARREN 2,722,156
DIFFERENTIAL SYSTEM FOR COMPARING RADIANT BEAMS
Filed June 20, 1952 2 Sheets-Sheet 1

INVENTOR.
Charles W. Warren
BY
Emery, Varney,
Whittemore & Dix
ATTORNEYS

United States Patent Office 2,722,156
Patented Nov. 1, 1955

2,722,156

DIFFERENTIAL SYSTEM FOR COMPARING RADIANT BEAMS

Charles W. Warren, North Plainfield, N. J.

Application June 20, 1952, Serial No. 294,683

5 Claims. (Cl. 88—14)

This invention relates to a differential system for comparing beams of radiant energy, such as light beams. Apparatus for comparing the intensity of light beams is an essential part of spectrometer systems which pass a light beam through a liquid, or reflect it from, material to be tested; and then compare the intensity of the transmitted or reflected light with another beam which is used as a control.

It is a common practice to pass the light through a monochromator which supplies the light in different wave lengths successively. The light beam is split, one half being directed to the material under test and the other half being used as the control for comparison. The beams are supplied to lead sulphide cells, photocells, or other light responsive detectors and it has been a common practice to chop the light mechanically in order to produce signals in the detector circuits for purposes of comparison.

It is an object of this invention to provide an improved system for comparing the light beams, or other beams of radiant energy, for example, heat; but the invention will be described as applied to light beams, and it will be understood that it can be changed for other beams by making any necessary changes in the beam splitter and the detectors.

One improvement is the provision of an alternating or pulsating voltage supply to the detectors. This makes beam choppers unnecessary, and eliminates what has generally been a mechanical shutter and motor.

Another feature of the invention relates to a feed back of a differential voltage to strengthen the signals in one branch of the circuit, preferably the one controlled by the beam which is transmitted or reflected, to build up the signal strength in that branch of the circuit. The building up of the weaker signals, instead of cutting down the strength of the control signals, as is common in the prior art, has the advantage of always operating with signals of substantial strength, and using the equipment within the range where it has its optimum operation.

By using a tight loop servo feed back to build up the signals of the weaker circuit, no motors or other moving parts are required, and this lowers production and maintenance costs.

With this invention any twin beam system can be brought close enough to balance to obtain freedom from drift; and light source and line voltage variations are substantially cancelled out. No specially regulated high voltage power supply is required. Standard unmodified recorders can be used. The complete flexibility of the input system makes it suitable for temperature sensitive resistors, photo-cells, photo-multipliers, lead sulfide cells, or other heat or light sensitive detectors that will produce the electric signals for the circuits.

For logarithmic or other curves, non-linear elements can be used in the feed-back circuit. The use of alternating or pulsating direct current having sine waves eliminates objectionable harmonics that result from the square waves produced by shutters or other mechanical choppers.

Other objects, features and advantages of the invention will appear or be pointed out as the description proceeds.

Figure 1:
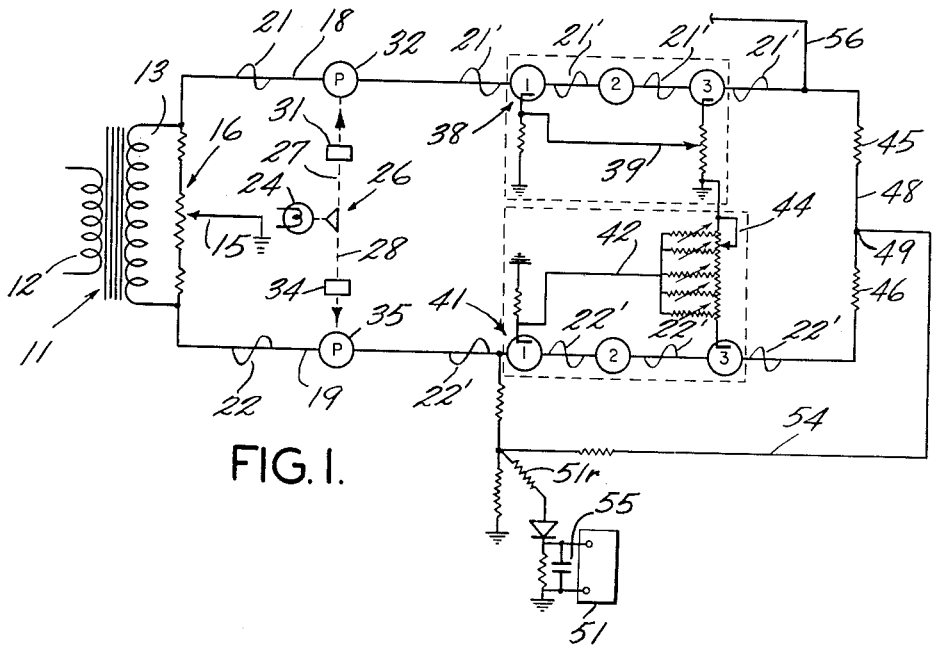
Figure 2:
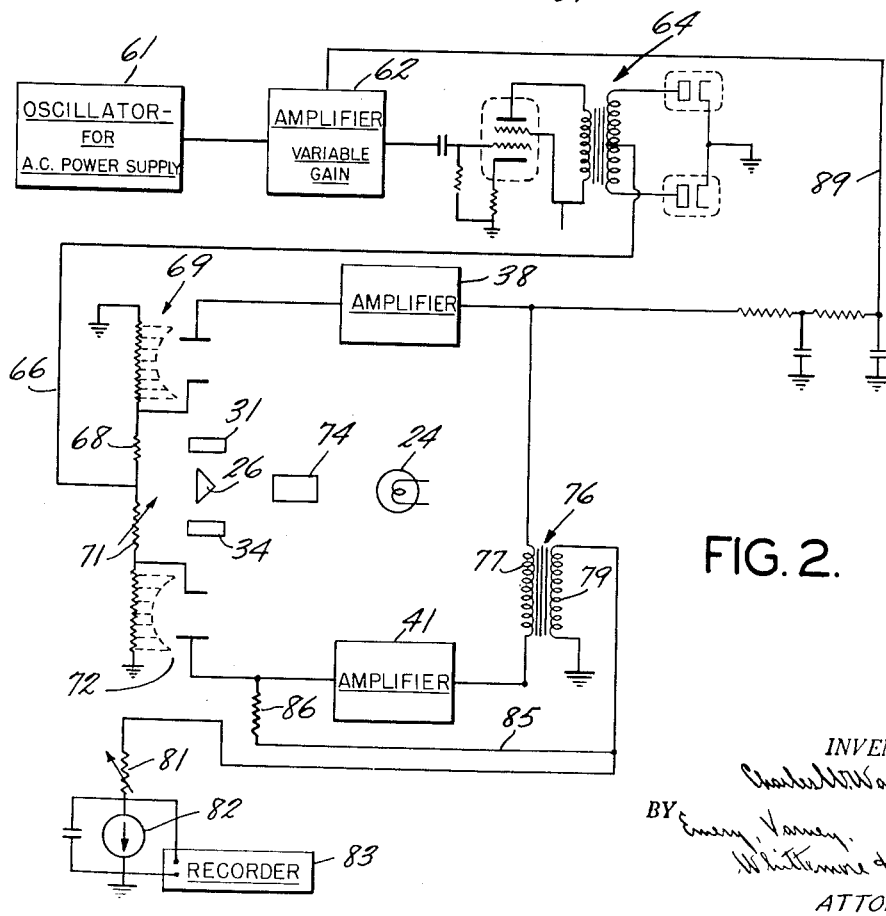

In the drawing, forming a part hereof in which like reference characters indicate corresponding parts in all the views, Figure 1 is a block layout of a differential system for comparing light beams in accordance with this invention;

Figure 2 is a block layout, similar to Figure 1, but showing a modified form of the invention; and Figure 3 is a layout showing a modification of the system disclosed in Figure 1.

A transformer 11 has a primary winding 12 connected with a source of alternating current, and has a secondary winding 13 for supplying power to the apparatus for comparing light beams. An adjustable contact 15 is used to balance a ballast resistance circuit 16 connected across the output terminals of the transformer. Alternating-current power having voltage of opposite phase is supplied to conductors 18 and 19 from the opposite ends of the circuit 16, the voltage being indicated by the sine waves 21 and 22.

Light from a common source, such as an incandescent electric light 24, is supplied to a beam splitter 26 which divides the light into oppositely directed beams 27 and 28. The beam 27, which will be referred to as the "reference beam" passes through a reference cell 31 to a light intensity detector 32. The other light beam 28, which will be referred to as the "sample beam" passes through a sample cell 34 to a light intensity detector 35.

The sample cell may be filled with a solution of material to be tested, and the reference cell may be filled with water or air or such other fluid as is necessary for making the desired comparison with the material in the sample cell. This equipment comprising the reference cell 31 and the sample cell 34 is merely representative of the apparatus in which a light beam is modified by a test sample and its intensity then compared with that of a reference beam.

The light intensity detectors may be photocells, or lead sulphide cells, or multiplier photo tubes, or temperature sensitive resistors, or any other type of detector which will give different signals in accordance with the intensity of the beams 27 and 28. In Figure 1 the light intensity detectors 32 and 35 are lead sulfide or temperature sensitive resistors or detectors acting as resistance modulated devices which produce a full wave signal having both positive and negative loops.

The output signals from the detector 32 are supplied to an amplifier 38 which is shown diagrammatically as a three-stage unit with an adjustable gain circuit 39 for use in calibrating the equipment. A similar amplifier 41 is connected with the signal output circuit of the sample beam detector 35, and this second amplifier 41 has an adjustable gain circuit 42. A multi-potentiometer system 44 is connected in the circuit and is adjustable to balance the wave length sensitivity response of the detectors when the system is used with variations in the color of the light beams. When a monochromator is used, the arm 44 is mechanically coupled to the drive system of the monochromator to provide automatic equalization after being manually adjusted.

The amplifiers 38 and 41 are of the same construction, and made as much alike as practical. They are adjusted to obtain the exact balance of the output signals when the input signals are the same.

The phase of the signals at the output and at the different stages of the amplifiers 38 and 41 are indicated by the alternating current loops 21' and 22' respectively.

The amplifiers 38 and 41 supply signals to a termination circuit connected between the output sides of the amplifiers and including two resistors 45 and 46 connected together at their ends remote from the amplifiers by a conductor 48 on which there is a common tap 49 from which a differential voltage is taken. If the output signals from the amplifiers 38 and 41 are equal, and the resistors 45 and 46 are equal, then there will be no voltage at the intermediate tap 49 of this resistor circuit because the voltage on opposite sides of the tap are equal and opposite in phase.

If there is any difference in strength in the signals from the amplifiers 38 and 41 so that the voltages across the resistors 45 and 46 are not equal, then there will be a differential voltage available at the intermediate tap 49 and this voltage will be equal to the algebraic sum of the output voltages of the amplifiers 38 and 41. This voltage would be in phase with the stronger of the two signals and would be in correct phase for feeding back to strengthen the weaker of the two input signals 22'.

In practice, the voltage supplied to the resistor 46 is usually lower than the voltage supplied to the resistor 45 because the intensity of the light beam 28 is reduced when it is modified by a passage through the sample material in the cell 34. It is not essential that the sample light beam be of less intensity than the reference light beam, however, since the reference light beam can be passed through a material which modifies it to a predetermined reduced intensity, but the apparatus is not generally used in that way since there is an advantage in having light beams of strong intensity.

The differential voltage from the tap 49 is supplied to an indicator which may give instantaneous reading, but which is preferably a recording indicator 51, and if desirable an integrating indicator. The invention obtains more accurate results when operating without much difference in the amplified signals. This result is obtained by having a feed-back loop 54 through which the differential voltage from the intermediate tap 49 is supplied to the input side of the amplifier 41 to build up the strength of the signal from the sample beam detector 35 until there is only enough difference between the output signals of the amplifiers to operate the indicator and to maintain the compensation through the feed back circuit 54.

The indicator 51 can be connected adjacent to the tap 49, or to the feed-back circuit 54 at some other location. The significance of the displacement of the indicator 51 depends upon the calibration of the apparatus. Calibration determinations are well understood in the art and no explanation of them is necessary for a complete understanding of this invention.

The rectifier indicator circuit includes a resistor 51r to prevent this circuit from modifying the feed back signal. The circuit also has a filter 55 connected across the indicator 51.

Another feed-back loop 56 leads from the output of the amplifier 38 to the input control circuit for the transformer. This is for the purpose of maintaining a constant value for the power input of the apparatus, and will be explained more fully in connection with Figure 2.

Figure 2 shows a modified form of the invention. Parts which correspond to those shown in Figure 1 are indicated by the same reference characters as in Figure 1.

In order to be independent of the frequency of available power lines, the system shown in Figure 2 utilizes an oscillator 61 for supplying alternating current power of the desired frequency. The output of the oscillator 61 is amplified in a variable gain amplifier 62, and the output of the amplifier 62 is supplied to a full wave rectifier 64.

The full wave rectifier supplies power to a conductor 66 connected to a mid point of a detector circuit. This detector circuit includes a resistor 68 in series with a first photocell 69. At the other side of the conductor 66, there is a variable resistor 71 in series with a second photocell 72. The resistor 71 is adjusted to balance accurately the voltage supplied to the photocells 69 and 72.

A light beam from an electric light 24 is passed through a monochromator 74 to a beam splitter 26 from which the respective beams are passed through a reference cell 31 and a sample cell 34 to the beam intensity detectors comprising the photocells 69 and 72.

Since the photocells act as rectifiers, the signals from them will be pulsating, but this serves the purpose of the invention in that it varies the detector voltage while the light beam remains constant instead of flashing the light with a constant detector voltage, as common in the prior art.

The signals from the detector 69 pass through an amplifier 38, and the signals from the detector 72 pass through the amplifier 41.

On the output side of the amplifiers 38 and 41, there is a termination circuit including a transformer 76 with its primary winding 77 connected between the output circuits of the amplifiers. The signals from both amplifiers 38 and 41 are in phase and when they are equal, both ends of the primary winding have the same voltage and no current flows through the winding.

When there is a difference in the intensity of the light beams that fall on the detectors 69 and 72, the output signals from the amplifiers 38 and 41 are of different strength, and the stronger of these signals produces a flow of current through the primary winding 77 and induces a current in a secondary winding 79 of the transformer.

The secondary winding 79 of the transformer is connected through a resistor 81 to an indicator 82 and a recorder 83. The resistor 81 determines the percentage of the transformer output supplied to the indicator 82 and recorder 83, and the desirable percentage depends upon the sensitiveness of the indicator and recorder. The resistor 81 is preferably adjustable to vary the portion of the transformer output supplied to the instruments.

The circuit of the secondary winding 79 also has a feed-back circuit 85 to the input of the amplifier 41. This feed-back circuit includes a resistance 86. The power supplied to this feed-back circuit 85 increases the strength of the signals from the amplifier 41 and tends to build up the output signal of the amplifier 41 to a strength approaching that of the amplifier 38.

The voltage output of the transformer 76 is a function of the difference between the strength of the output signals of the amplifiers 38 and 41 which is in turn a function of the difference in the intensity of the light beams supplied to the photocell detectors 69 and 72. By measuring the output of the transformer 76, the indicator 82 and the recorder 83 produce readings which indicate the difference in the intensity of the light beams supplied to the respective photocell detectors.

The output of the amplifier 38 is connected with a feed-back circuit 89 which connects to a suitable point in the amplifier 62 to maintain a constant level for the voltage supplied to the photocell detectors.

As in the case of Figure 1, the circuit shown in Figure 2 can be used with different kinds of detectors, and the voltage to be supplied to the detectors will depend upon the type of detectors used. For example, the voltage will be from ten (10) to twenty (20) volts for simple photocells and from five hundred (500) to eight hundred (800) volts for multiplier tubes. These values are given merely by way of illustration.

Figure 3 shows another modification of the invention. Most of the circuit of Figure 3 is similar to that of Figure 1, and corresponding parts are indicated by the same reference characters as in Figure 1. The circuit in Figure 3 has resistors 45 and 46 connected with the output sides of the amplifiers 38 and 41 respectively. These resistors are connected together at the intermediate tap 49, but the power from this tap is not fed back directly to the circuit as in Figure 1. The parts shown in Figure 3 are made into a completely automatic system by connecting the intermediate tap 49 with the input side of a phase sensitive amplifier 90. The output from this amplifier 90 is used to operate a motor 92 which drives a recording and re-balance system.

The recorder is shown diagramatically and is indicated by the reference character 94. The motor 92 is also connected by a mechanical connection 95, with a voltage divider 96.

This voltage divider 96 is a potentiometer with its slide operated by the connection 95. One side of the resistor of the voltage divider 96 is connected with the output circuit of the amplifier 38 by a conductor 97 and the other side is grounded. The slider of the voltage divider 96 is connected with the input side of the amplifier 41 by a circuit 98 which includes a resistance 99.

The voltage divider 96 is constructed so as to have a voltage ratio which is the reverse of the amplification factor of the amplifier 38. For example, if the amplification factor of the amplifier 38 is 1000, the voltage divider 96 should have a voltage ratio of 1000 to 1.

The motor 92 runs as long as there is any voltage at the intermediate tap 49. This operation of the motor 92 adjusts the voltage divider 96 to feed back progressively higher voltage to the input side of the amplifier 41. This increase in voltage supplied to the amplifier 41 tends to decrease the voltage available at the tap 49. Eventually the output signals of the amplifier 41 are built up to the same value as the output signals of the amplifier 38. There is then no voltage at the tap 49 and the motor 92 stops.

The preferred embodiments of the invention have been illustrated and described, but various changes and modifications can be made without departing from the invention as define in the claims.

What is claimed is:

1. Apparatus for comparing the intensity of light beams including, in combination, a beam splitter that divides the light from a common source into two beams, one of which is to be modified by a test sample and the other of which is to be used as a reference beam, a first light intensity detector beyond the test sample and in the path of the light beam that is modified by the sample, a second light intensity detector in the path of the reference beam, an alternating current transformer, connections through which the transformer supplies alternating current voltage of opposite phase to the respective detectors, amplifiers of similar construction and connected with the respective detectors for amplifying the signals from the detectors, a resistor at the output side of each amplifier, a center tap between the resistors and on a connection between the corresponding ends of said resistors for supplying a differential voltage which is a function of the difference in the intensity of the light beams, and a circuit through which the center tap for the differential voltage is connected to the input side of the amplifier which is connected with the detector that is in the path of the light beam which is modified by the test sample.

2. Apparatus for testing the relative intensity of light beams including a beam splitter that receives light from a common source and divides it into two beams of equal intensity, a reference cell in the path of one beam, a sample cell in the path of the other beam for holding a sample of material being tested, light intensity detectors beyond the cells, a different detector being located in the path of each of the light beams, a circuit through which pulsating power is supplied to each of the detectors, an amplifier to which signals are supplied from the reference cell beam detector, another amplifier to which signals are supplied from the sample cell beam detector, a termination circuit connected between the output sides of the amplifiers, a conductor at an intermediate location of the termination circuit from which a differential voltage is taken when there is a voltage drop across the termination circuit, and a feed-back loop from said conductor to the input side of the amplifier that receives signals from the sample cell beam detector.

3. A differential system for comparing the intensity of light beams including two light intensity detectors, one of which receives light from a reference beam, and the other of which receives light modified by a test sample and the intensity of which may be reduced to a limit approaching zero for some samples of material, an amplifier that receives signals from the reference beam detector, another amplifier that receives signals from the sample beam detector, a termination circuit connected between the output sides, of the amplifiers, a conductor at an intermediate location of the termination circuit for taking off a differential voltage that depends upon the difference in the strength of the signals from the respective detectors, and a feed-back loop from said conductor to the amplifier in one of the beam detector circuits for adjusting the grain of that amplifier to bring its output more nearly equal to the output of the amplifier in the other beam detector circuit.

4. A differential system for comparing the intensity of light beams, as described in claim 3, characterized by an alternating current circuit through which alternating current power of opposite phase is supplied to the respective detectors, and the detectors and amplifiers deliver an alternating current output of opposite phase to the opposite ends of the termination circuit, and said termination circuit includes resistors having the intermediate tap from which the differential voltage is taken for the feed back loop to the adjustable gain amplifier in the circuit with the sample beam detector, and in which indicating apparatus is also connected with the intermediate tap of the impulse circuit for operation by the differential voltage.

5. A differential system for comparing the intensity of light beams as described in claim 3, characterized by means for supplying pulses of unidirectional voltage to both amplifiers with the pulses of voltage in phase with one another, and in which the termination circuit includes a transformer having the opposite ends of its primary winding connected to the output sides of the amplifiers, and in which said conductor includes the secondary winding of the transformer.

References Cited in the file of this patent

UNITED STATES PATENTS

| | | |
|---|---|---|
| 2,350,001 | Van Den Akker | May 30, 1944 |
| 2,437,323 | Heigl et al. | Mar. 9, 1948 |
| 2,481,485 | Stanton | Sept. 13, 1949 |
| 2,549,402 | Vossberg, Jr. | Apr. 17, 1951 |